United States Patent [19]

Holzer

[11] 4,418,886
[45] Dec. 6, 1983

[54] ELECTRO-MAGNETIC VALVES PARTICULARLY FOR HOUSEHOLD APPLIANCES

[76] Inventor: Walter Holzer, Drosteweg 19, 7758 Meersburg, Fed. Rep. of Germany

[21] Appl. No.: 354,714

[22] Filed: Mar. 4, 1982

[30] Foreign Application Priority Data

Mar. 7, 1981 [DE] Fed. Rep. of Germany ....... 3108693

[51] Int. Cl.³ ............................................. F16K 31/02
[52] U.S. Cl. ...................................... 251/30; 251/45; 251/141; 335/275
[58] Field of Search ........................... 251/30, 45, 141; 335/275, 276

[56] References Cited

U.S. PATENT DOCUMENTS

| | | | |
|---|---|---|---|
| 1,706,404 | 3/1929 | Jacobson et al. | 251/45 |
| 2,160,117 | 5/1939 | Borresen | 251/30 |
| 2,292,477 | 8/1942 | Ray | 251/30 |
| 2,412,490 | 12/1946 | Biggle | 251/30 |
| 3,090,592 | 5/1963 | Fleer | 251/30 |
| 3,654,963 | 4/1972 | Ages | 251/30 |
| 3,765,452 | 10/1973 | Charron | 251/30 |
| 3,934,816 | 1/1976 | Terrell et al. | 251/30 |

*Primary Examiner*—George L. Walton
*Attorney, Agent, or Firm*—Lilling & Greenspan

[57] ABSTRACT

The electro-magnetic valve includes a hydraulic pilot control consisting of an inlet and outlet with a concentric valve seat, sealable by a flexible diaphragm. The inlet and outlet are both arranged on one side of the diaphragm and a hydraulic pressure is arranged on the other side of the diaphragm. A filling aperture from the inlet to the pressure chamber and a central pressure relief aperture from the pressure chamber to the outlet are provided, the central pressure relief aperture being connected to a bypass in the valve body. An electromagnetic means for opening the pressure relief aperture is also included.

10 Claims, 4 Drawing Figures

ELECTRO-MAGNETIC VALVES PARTICULARLY FOR HOUSEHOLD APPLIANCES

BACKGROUND OF THE INVENTION

This invention relates to improvements in electro-magnetic valves, particularly for household appliances.

The rapid development of the household appliance industry in the last 30 years has triggered a similar development in the case of accessory parts. Compact type of construction, rational mass production, designs appropriate for the material involved, i.e. designs appropriate for plastics material, and working reliability were what showed the way.

In the field of electro-magnetic valves, without exception the same basic design principle has been used since 1946 see U.S. Pat. No. 2,562,315. All electro-magnetic valves to be found on the market are based on this design principle.

The apparatus of the prior art (see FIG. 1) comprise an electro-magnetic valve having hydraulic pilot control, consisting of a valve body (1) having an inlet (5) and an outlet (6), with a concentric valve seat (10) which is sealable by a flexible diaphragm (2), in which respect both the inlet and the outlet are arranged on one side of the diaphragm; a hydraulic pressure chamber (3) on the other side of the diaphragm; a filling aperture (7) from the inlet (5) to the pressure chamber (3) and a central pressure-relief aperture (11) in the diaphragm (2) from the pressure chamber (3) to the outlet 6; and an electro-magnetic means for opening the pressure-relief aperture, for example, in the form of a moving-coil armature (16).

The electro-magnetic valves to be found on the market nowadays differ merely in design details, but all operate in accordance with the method described in U.S. Pat. No. 2,562,315.

To effect hydraulic closing of the diaphragm, as the fluid flows through the small filling aperture (7) from the inlet (5) into the pressure chamber (3), the flexible diaphragm (2) is pressed onto the valve seat (10). As soon as the moving-coil armature (16) is drawn into the magnet coil (14), fluid emerges from the pressure chamber (3) through the pressure-relief aperture (11) into the outlet (6), the pressure chamber (3) is relieved and the flexible diaphragm (2) is lifted from the valve seat (10) by the water pressure occurring from the inlet (5) and the water flowing through the valve is discharged.

When the current is switched off, the moving-coil armature (16) closes the pressure-relief aperture (11), water flows through the filling aperture from the inlet into the pressure chamber (3), so that the flexible diaphragm (2) is pressed onto the valve seat (10). In this respect it is possible, by correct dimensioning of the filling aperture (7), to bring about a slow closure of the valve, in order to avoid damage by water hammer.

This advantage, as well as the relatively slight actuating forces, have displaced practically all other systems on the market. The main disadvantage of the magnetic valves to be found on the market nowadays is the relatively high electrical power requirement, which on the one hand requires a critical monitoring of the heating of the coils, and on the other hand makes these valves appear to be unsuitable for a direct electronic control.

SUMMARY OF THE INVENTION

The task of the invention is, in the case of magnetic valves of the kind mentioned at the beginning hereof, to reduce to a minimum the magnetic resistances of the system and thus to reduce considerably the necessary electrical power required. In this respect, where possible, mass-production technologies acquired in several decades are to be adhered to.

In accordance with the invention, it is therefore proposed to construct an electro-magnetic valve having hydraulic anticipatory control in a known manner, i.e. consisting of a valve body having an inlet and an outlet; a valve seat which is sealable by a flexible diaphragm, in which respect both the inlet and the offlet are arranged on one side of the diaphragm; a hydraulic pressure chamber on the other side of the diaphragm; a filling aperture from the inlet to the pressure chamber and a pressure-relief aperture from the pressure chamber to the outlet; and an armature which, in the currentless state, under spring pressure closes the pressure-relief valve. Differing from the previous prototypes, the pressure-relief aperture is arranged not in the diaphragm; but in the valve body as a by-pass, which leads from the pressure chamber to the outlet.

In this way a decisive improvement in the magnetic system is achieved, since the necessary opening path of the pressure-relief valve no longer depends on the movement of the diaphragm and can be reduced to a fraction of the previously necessary path.

In this way it is possible to design the armature as a hinged armature having minimum magnetic losses.

More particularly the design, in accordance with the invention, includes a hinged armature as a two-part lever, one side of which is loaded by a spring bringing about the closure pressure and the other side of which closes the pressure-relief aperture. This permits a reliable and simple construction of the system, particularly if the spring is arranged close to the bearing of the armature on a one pole shoe of the magnet system.

In the case of free-standing pole shoes, in accordance with the invention, a flat-plane member can be provided as the armature, which tilts about an edge of the pole shoe.

In the case of pole shoes which are cast-in or injected-in a flush manner, in accordance with the invention, it is proposed to bend the hinged armature, in the region of its bearing, away from the pole shoes, in order to make possible a tilting motion under the action of the spring.

In accordance with the invention, it is also recommended to provide an insert in the non-flexible region of the diaphragm seal, which, besides the retention of the diaphragm seal, also supports the spring of the magnet system.

The insert is, in accordance with the invention, designed as a guide for the armature.

In order to simplify the diaphragm as much as possible, in accordance with the invention it is also recommended to arrange the filling aperture from the intake to the pressure chamber in the valve body, so that the diaphragm can be made without any aperture.

In this case, the insert can, in the region of the filling aperture, be screen-like in design, by being provided for example with slits, which protect the actual filling aperture against clogging.

Should no insert be provided, in accordance with the invention, it is recommended to arrange, in the intake, screen-like slits in front of the actual filling aperture.

BRIEF DESCRIPTION OF THE DRAWINGS

The invention will be described with reference to the accompanying drawings:

FIGS. 3 and 4 are detail sections.

DETAILED DESCRIPTION OF THE INVENTION

Figure 1:
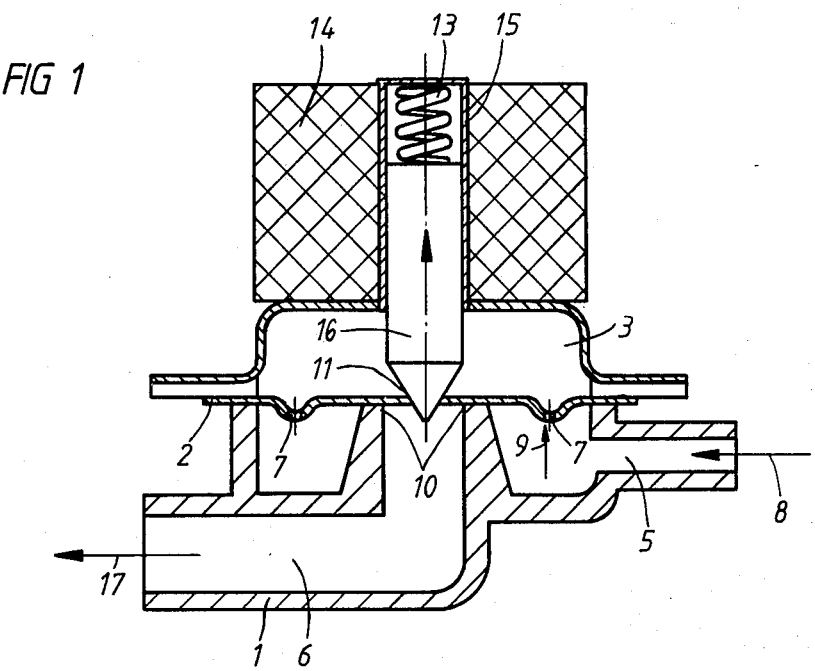
FIG. 1 is a vertical section of a prior art valve.
Figure 2:
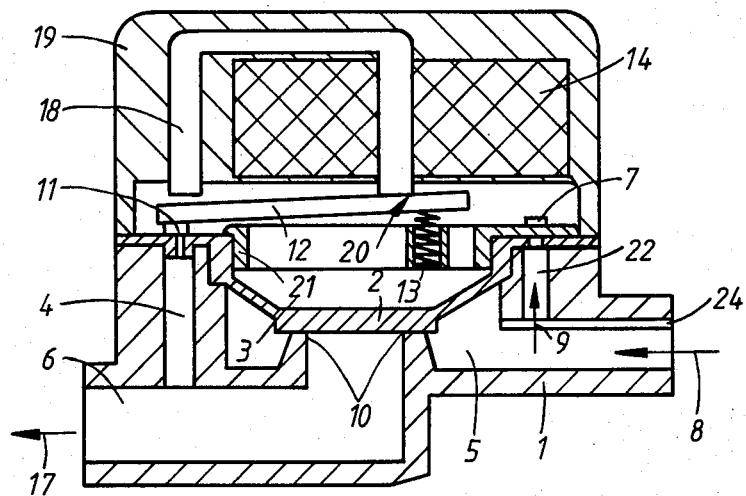
FIG. 2 is a vertical section view of the invention.

Referring now to the instant invention, wherein it is shown in FIG. 2, the same parts are designated by the same number. What is materially intrinsic is the fact that the diaphragm (2) has, in its flexible working region, no apertures of any kind, and the diaphragm can move in an unimpeded manner. Here too, the water flowing into the inlet in the direction of the arrow (8) attempts to press the diaphragm upwards, but the water flowing in the direction of the arrow (9) through the filling aperture (7) into the pressure chamber (3) presses the diaphragm (2) securely onto the valve seat (10).

In accordance with the invention, a by-pass (4) which connects the pressure chamber (3) to the outlet (6) is arranged in the magnetic valve body (1). The actual pressure-relief aperture (11) is held closed by the armature (12) (in this exemplified embodiment a hinged armature) under the pressure of the spring (13). The hinged armature (12) is designed as a two-side lever which tilts about the edge (20) of the magnet yoke and on one side closes the pressure-relief aperture (11) and on the other side is loaded by the spring (13).

In this respect it is advantageous to arrange the point of contact or bearing of the spring (13) on the hinged armature (12), as shown in FIG. 2, close to the edge (20) of the magnet yoke, in order to achieve a good bearing pressure of the hinged armature of the magnet yoke (18).

In the embodiment of FIG. 2, the magnet yoke (18) is inserted into the magnet coil (14) in a plastic housing (19), from which the edge or leg (20) of the magnet yoke protrudes, so that the hinged armature (12) can be designed as a flat-plane part and, nevertheless, a tilting motion about the leg (20) is possible.

Figure 3:
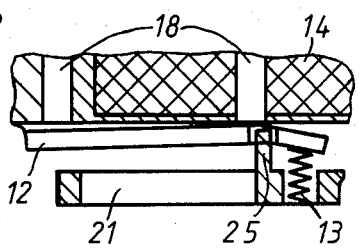
FIG. 3 is an enlarged, vertical section view, showing the insert.

Should it be preferred, for production-technique reasons, to design the magnet yoke (18) flush with the plastic housing (19), it is recommended, in accordance with the invention, to bend the hinged armature, in the region of its bearing, away from the pole shoes, as is shown in FIG. 3.

In order to be able to seal off the pressure-relief aperture (11) without needing additional parts, it is provided in FIG. 2 as part of the diaphragm (2) consisting mainly of soft rubber, and is centered in the by-pass (4). The soft valve seat of the pressure-relief aperture (11) can be sealed directly by the hinged armature (12).

It is furthermore proposed to provide, in the non-flexible region of the diaphragm (2), an insert (21) which not only improves the mounting support of the diaphragm (2) in the valve housing (1), but also supports the spring (13).

This insert can also be designed as a guide for the armature, as shown in FIG. 3. The insert (21) possesses, for example, one or more noses (25) which extend into corresponding recesses of the hinged armature (12) and thereby determine the position thereof.

A further development of the invention consists in guiding the filling aperture (7) by an insert (21) and in designing it in the region of the filling aperture provided with slots in a screen-like manner. In this respect it is pre-supposed that also for the filling aperture a by-pass (22) from the intake (5) to the pressure chamber (3) is arranged in the valve housing.

Since the filling aperture should only be about 0.3 mm diameter, in order to bring about the slow hydraulic closing of the diaphragm, particles suspended in the water must be prevented from clogging this aperture and endangering the operation of the magnetic valve. This is carried out by having slits providing a screen effect present in the insert (21) in the region of the filling aperture.

Figure 4:
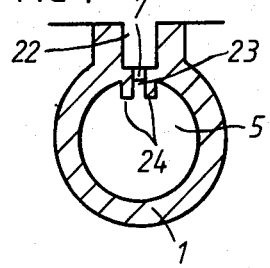
FIG. 4 is an end view, showing another arrangement of the filling aperature and the inlet.

Another arrangement consists, as shown in FIG. 4, in providing a longitudinal slit (23) between two webs (24) in which the actual small filling aperture (7), from the by-pass (22), ends. In this respect it must be kept in mind that the slit (23) should be somewhat narrower than the filling aperture (7), so that small pieces which settle in front of the slit can never reach the actual small filling aperture (7). This version can be realised in a simple manner in valve housing (1) made of plastics material.

The embodiment described shows how fundamentally the magnet system is improved by the arrangement in accordance with the invention.

Measurements have shown that a magnetic valve in accordance with the invention takes only 1/30th of the conventional electrical power and is thereby usable for the direct control of electronic circuits.

Moreover, considerable further design improvements and simplifications are illustrated in the drawings.

I claim:

1. An electro-magnetic valve having hydraulic control consisting of a valve body having an inlet and an outlet, a valve seat sealable by a flexible diaphragm, in which both the inlet and the outlet are arranged on a first side of the diaphragm, a hydraulic pressure chamber on a second side of the diaphragm, a filling aperture from the inlet to the pressure chamber and a pressure-relief aperture from the pressure chamber to the outlet, an armature which, when unenergized, closes the pressure-relief aperture under spring pressure, wherein the improvement comprises said hinged armature being positioned entirely within the pressure chamber and said pressure-relief aperture being opened when said armature is energized; a valve seat of said pressure-relief aperture being a non-flexible part of said diaphragm; and a by-pass in the valve body connecting the pressure-relief aperture and the pressure chamber to the outlet, and said valve seat of said pressure relief aperture being juxtapositioned to said bypass.

2. An electro-magnetic valve as claimed in claim 1, wherein the hinged armature includes a two-sided lever, a first side being loaded by a spring causing the closing pressure and a second side closing the pressure-relief aperture.

3. An electro-magnettic valve as claimed in claim 1, wherein the spring is arranged close to the bearing of the armature on one pole shoe of the magnet system.

4. An electro-magnetic valve as claimed in claim 1, wherein the hinged armature comprises a flat plane part pivotable about a leg of the pole shoe.

5. An electro-magnetic valve as claimed in claim 1, wherein the hinged armature is bent, in the region of its bearing, away from the pole shoes.

6. An electro-magnetic valve as claimed in claim 1, wherein an insert supports the spring of the magnet system and is positioned in the pressure chamber above the diaphragm.

7. An electro-magnetic valve as claimed in claim 6, wherein slits are formed in said insert, in the region of the filling aperture, in a screen-like manner.

8. An electro-magnetic valve as claimed in claim 6, wherein the insert serves as a guide for the armature.

9. An electro-magnetic valve as claimed in claim 1, wherein the filling aperture to the pressure chamber is arranged in the valve body.

10. An electro-magnetic valve as claimed in claim 1, wherein a screen-like slit is arranged in the inlet in front of the filling aperture.

* * * * *